United States Patent
Mei et al.

(10) Patent No.: US 9,276,269 B2
(45) Date of Patent: Mar. 1, 2016

(54) CATALYST LAYER, MEMBRANE ELECTRODE ASSEMBLY, AND ELECTROCHEMICAL CELL

(71) Applicants: Wu Mei, Yokohama (JP); Shigeru Matake, Yokohama (JP); Taishi Fukazawa, Tokyo (JP); Yoshihiro Akasaka, Kawasaki (JP); Katsuyuki Naito, Tokyo (JP)

(72) Inventors: Wu Mei, Yokohama (JP); Shigeru Matake, Yokohama (JP); Taishi Fukazawa, Tokyo (JP); Yoshihiro Akasaka, Kawasaki (JP); Katsuyuki Naito, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/628,649

(22) Filed: Sep. 27, 2012

(65) Prior Publication Data

US 2013/0078550 A1 Mar. 28, 2013

(30) Foreign Application Priority Data

Sep. 28, 2011 (JP) .................................. 2011-213299

(51) Int. Cl.
*H01M 4/92* (2006.01)
*H01M 8/10* (2006.01)

(52) U.S. Cl.
CPC ........ *H01M 4/92* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 7,435,495 | B2 * | 10/2008 | DeSimone et al. | 429/442 |
| 2004/0209145 | A1 * | 10/2004 | Mizukoshi et al. | 429/34 |
| 2008/0261103 | A1 * | 10/2008 | Ueda | H01M 4/8605 |
| | | | | 429/480 |
| 2009/0092879 | A1 * | 4/2009 | Kreidler et al. | 429/30 |
| 2010/0021787 | A1 * | 1/2010 | Wu et al. | 429/30 |
| 2010/0209815 | A1 * | 8/2010 | Tolmachev | 429/483 |

FOREIGN PATENT DOCUMENTS

| | | |
|---|---|---|
| JP | 2007-507328 | 3/2007 |
| JP | 2010-33759 | 2/2010 |
| JP | 2010-530805 | 9/2010 |

OTHER PUBLICATIONS

Larminie J. and Dicks A. "Fuel Cell Systems Explained" Second Edition, John Wiley & Sons Ltd, 2003. p. 92. TK2931.L37.*
Zhang ("PEM Fuel Cell Electrocatalysts and Catalyst Layers: Fundamentals and Applications", p. 904) (2008).*
Japanese Office Action mailed on Dec. 16, 2014 in Japanese Patent Application No. 2012-213208 with English translation.

* cited by examiner

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

A catalyst layer containing a catalyst material, the catalyst layer having a porosity of 20 to 90% by vol and satisfying a relation: $R1 \geq R0 \times 1.2$, wherein $R1$ is an alignment ratio of the catalyst layer; and $R0$ is an alignment ratio of the catalyst material in powder form having a random crystalline plane distribution, and each of the alignment ratios is calculated from a X-ray diffraction spectrum having a diffraction angle $2\theta$ range from 10 to 90 degree measured using Cu-K$\alpha$-rays.

12 Claims, 4 Drawing Sheets

CATALYST LAYER, MEMBRANE ELECTRODE ASSEMBLY, AND ELECTROCHEMICAL CELL

CROSS-REFERENCE TO RELATED APPLICATIONS

This application is based upon and claims the benefit of priority from Japanese Patent Application No. 2011-213299, filed Sep. 28, 2011, the entire contents of which are incorporated herein by reference.

FIELD

Embodiments described herein relate generally to a catalyst layer, a membrane electrode assembly, and an electrochemical cell.

BACKGROUND

Studies of electrochemical cells have been enthusiastically made in recent years. For example, a fuel cell among electrochemical cells includes a system configured to electrochemically react with the fuel such as hydrogen with an oxidizer such as oxygen to generate electric power. Among these fuel cells, a polymer electrolyte membrane fuel cell (PEFC) is operable at a lower temperature than other fuel cells and produces water as a reaction product so that it is clean to environment and has been therefore put to practical use as power sources for household stationary use and for vehicles.

In a catalyst layer contained in each electrode of PEFC, a carbon-supported catalyst obtained by supporting a catalyst material on a carbon black support is generally used.

When PEFC is used, for example, as a power source for vehicles, the carbon support contained in the catalyst layer is corroded by start and stop operations, and also, the catalyst supported on the carbon support is itself also dissolved. It is reported that this promotes the deterioration of the catalyst layer and the membrane electrode assembly (MEA) including the catalyst layer. For this, it is desired to improve the durability of the catalyst layer.

In light of this, the adoption of a carbonless catalyst layer formed by sputtering or vapor deposition of catalyst material is examined. For example, there is a catalyst layer obtained by sputtering a whisker substrate with platinum. There is also a catalyst layer including a void layer obtained by stacking a catalyst material layer and a pore-forming material layer alternately on each other and then, by dissolving/removing the pore-forming material layer. The deterioration of the catalyst support caused by corrosion can be avoided by the use of the carbonless catalyst layer like this. However, the resistance of these catalysts to dissolution is still insufficient and therefore needs to be further improved.

DETAILED DESCRIPTION

Figure 1:
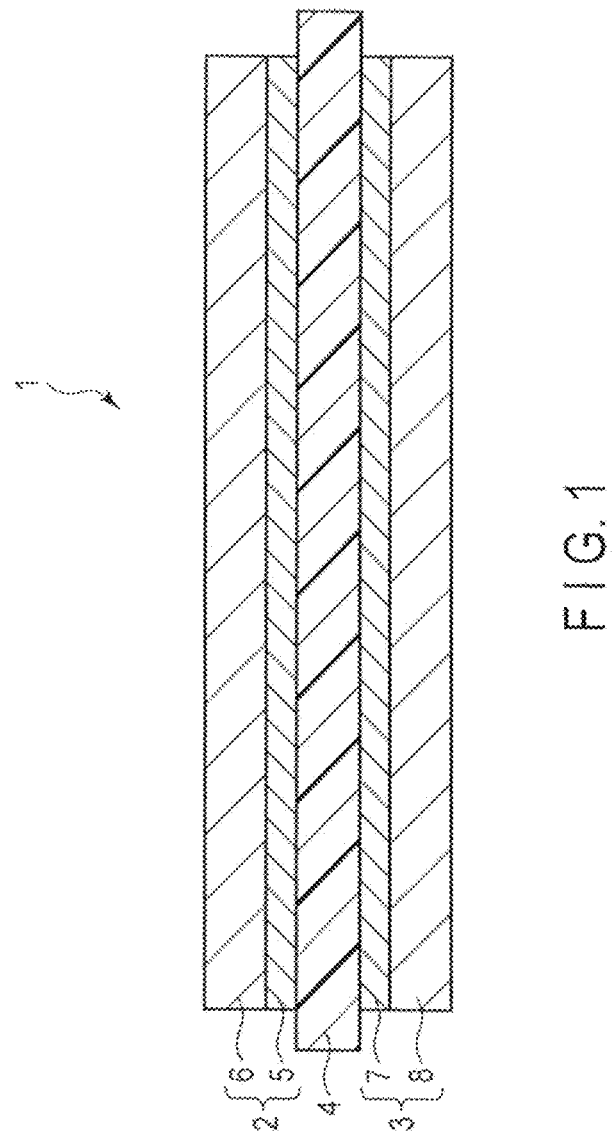
FIG. 1 is a cross-sectional view of a membrane electrode assembly according to an embodiment.

In general, according to one embodiment, there is provided a catalyst layer containing a catalyst material. The catalyst layer satisfying requirements below:

a porosity of 20 to 90% by vol; and a relation $R_1 \geq R_0 \times 1.2$.

In the above inequality, $R_1$ represents an alignment ratio (R) of the catalyst layer and $R_0$ represents an alignment ratio of the catalyst material in powder form in which crystalline planes of the catalyst material orient randomly. Each of the alignment ratios is calculated from a X-ray diffraction spectrum having a diffraction angle $2\theta$ range from 10 to 90 degree measured using Cu-K$\alpha$-rays, and is defined as a ratio of the diffraction peak area contributed by the most closely packed crystalline planes of a material to the total area of all diffraction peaks of the same material at the $2\theta$ range from 10 to 90 degree.

Embodiments of the present invention are explained below in reference to the drawings. In each of the drawings, portions which exhibit the same or similar functions are indicated by the same reference numerals and any overlapping descriptions are avoided.

FIG. 1 is a cross-sectional view of a membrane electrode assembly according to the embodiment.

The membrane electrode assembly (hereinafter also referred to as MEA) 1 is provided with a first electrode 2, a second electrode 3, and an electrolyte membrane 4. The electrolyte membrane 4 is inserted between the first electrode 2 and the second electrode 3. On one surface of the electrolyte membrane 4, a first catalyst layer 5 and a first gas diffusion layer 6 are stacked in this order to form a first electrode 2. Further, on another surface of the electrolyte membrane 4, a second catalyst layer 7 and a second gas diffusion layer 8 are stacked in this order to form a second electrode 3.

First, the catalyst layer according to the embodiment will be explained. Although it is enough that at least one of the first electrode 2 and second electrode 3 includes the catalyst layer having a structure explained below, the catalyst layer 5 and catalyst layer 7 both preferably have the following structure. When the first and second catalyst layers 5 and 7 both have the following structure, the catalyst materials contained in the first and second catalyst layers 5 and 7 may be the same or different. Hereinafter, as the term indicating one of the first and second catalyst layers 5 and 7 or both of the first and second catalyst layers 5 and 7, the term "catalyst layer 5, 7" is also used.

The catalyst layer 5, 7 according to the embodiment contains a catalyst material. The catalyst material contains a metal or two or more elements selected from the group consisting of precious metals such as Pt, Ru, Rh, Os, Ir, Pd, and Au. Such a catalyst material is superior in catalyst activity, conductivity, and stability.

According to other example, the catalyst material may be a complex oxide or a mixture oxide containing oxides of two or more metals selected from the above group.

When the catalyst layer 5, 7 is used in hydrogen oxidation reaction or hydrogen generation reaction, the catalyst layer 5, 7 contains, for example, Pt.

When the catalyst layer 5, 7 is used in oxidation reaction of a reformed hydrogen gas containing CO or alcohol such as methanol and ethanol, the catalyst layer 5, 7 contains an alloy having a composition represented by the formula $Pt_yRu_zT_{1-y-z}$. Here, $0.2 \leq y \leq 0.8$ and $0 \leq z \leq 0.8$, and the element T is at least one element selected from the group consisting of W, Hf, Si, Mo, Ta, Ti, Zr, Ni, Co, Nb, V, Sn, Al, and Cr. In this case, the alloy contains 20 to 80 at % of Pt, 0 to 80 at % of Ru, and 0 to 80 at % of element T.

When the catalyst layer 5, 7 is used in oxygen reduction reaction, the catalyst layer 5, 7 contains an alloy having a composition represented by, for example, the formula $Pt_u M_{1-u}$. Here, u is defined by the following equation: $0 < u \leq 0.9$, the element M is at least one element selected from the group consisting of Co, Ni, Fe, Mn, Ta, W, Hf, Si, Mo, Ti, Zr, Nb, V, Cr, Al, and Sn. In this case, the alloy contains greater than 0 at % to 90 at % or less of Pt, and 10 at % or more to less than 100 at % of the element M.

When the catalyst layer 5, 7 is used in oxygen generation reaction, the catalyst layer 5, 7 contains an oxide of at least one metal selected from the group consisting of Ir, Ru, Pt, Au, Rh, and Os, or a complex oxide of these metal oxides and an oxide of Ta or Sn.

The catalyst layer 5, 7 preferably contains platinum or iridium in a ratio of 30 at % or more (i.e. 30 to 100 at %). Such a composition enables the compatibility between the activity and durability of a catalyst material.

Figure 2:
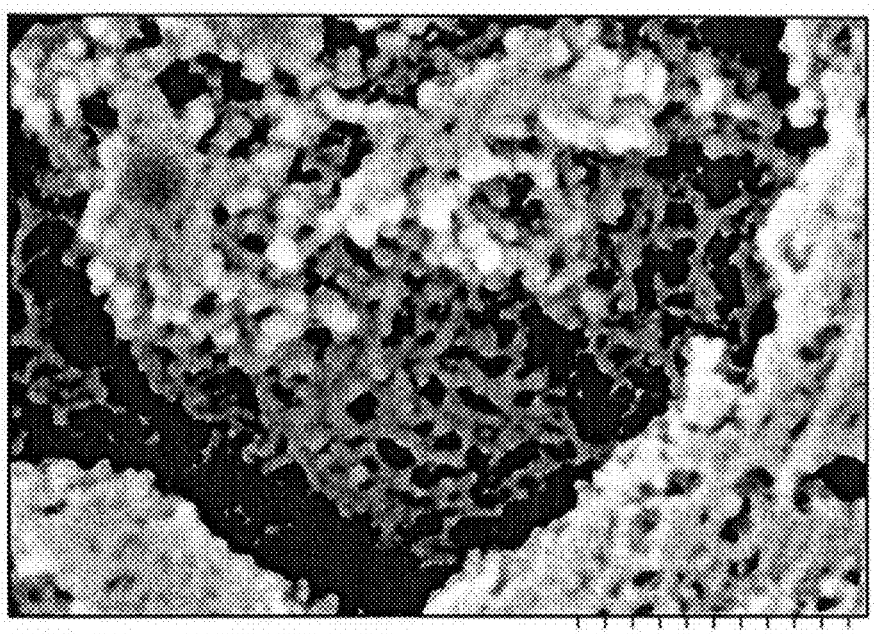
FIG. 2 is a view showing an image of a catalyst layer according to an embodiment observed by a scanning type electron microscope.
Figure 3:
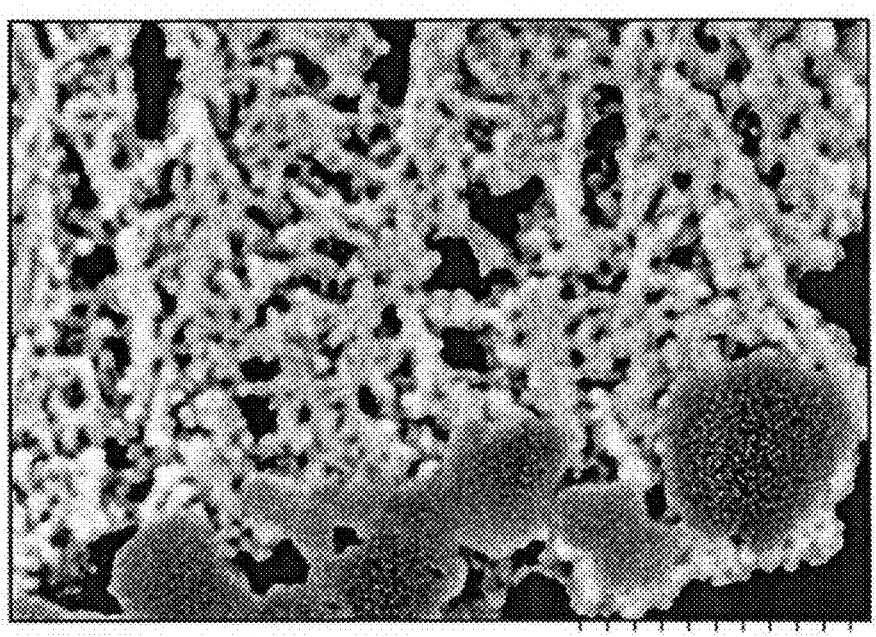
FIG. 3 is a view showing an image of a catalyst layer according to an embodiment observed by a scanning type electron microscope.

FIGS. 2 and 3 each shows a view showing an image of a catalyst layer according to the embodiment observed at a magnification of 200,000 by a scanning electron microscope (SEM). As shown in FIGS. 2 and 3, each of the catalyst layer 5, 7 has a porous structure including pores although a structure of the catalyst layer depends on a process of fabricating and a composition of the catalyst layer. A structure of the catalyst layer shown in FIG. 2 exhibits large holes while a structure of the catalyst layer shown in FIG. 3 has a structure in which the catalyst materials are connected each other compactly as one.

The catalyst layer 5, 7 has a porosity of 20 to 90% by vol. If the porosity is designed to be excessively small, there is the case where the supply of fuel, removal of reaction products, and transfer of protons do not work smoothly. If the porosity is designed to be excessively large, the catalyst layers 5, 7 are easily broken and there is therefore the case where only insufficient resistance to dissolution is obtained. The catalyst layers 5, 7 preferably have a porosity of 40 to 90% by vol. Such a large porosity is advantageous in increasing the specific surface areas of the catalyst layers 5, 7 to thereby obtain high catalyst activity.

In one example, the ratio of pores having a pore diameter ranging from 5 to 100 nm to all pores is 50% by vol or more (i.e. 50 to 100% by vol). When this ratio is high, mass transfer in the catalyst layers 5, 7 is promoted. The volume and ratio of pores in the catalyst layers 5, 7 can be controlled by, for example, the particle diameter and amount of pore-forming material which will be explained later and sputtering conditions.

The thickness of the catalyst layers 5, 7 is, for example, 20 nm to 10 μm.

The catalyst layer 5, 7 according to the embodiment may be stacked prior to use.

When the catalyst layers are stacked, a void layer or a fiber layer may be inserted between the catalyst layers. In this case, the average thickness of each catalyst layer is preferably 20 to 200 nm. If the average thickness is too low, this causes increase in production cost and it is difficult to obtain long-term dissolution resistance. If the average thickness is too high on the other hand, there is the possibility of deterioration in the characteristics of an electrochemical cell because the amount of fuel to be supplied per specific surface of the catalyst layer is reduced.

The void layer is a vacant spacing between the catalysts layers. Further, the fiber layer is made of carbon fibers, carbon nanofibers, or carbon nanotubes. The fiber layer is formed such that it has a porosity of 50% or more.

The average thickness of the void layer or fiber layer is preferably 10 to 500 nm. When the average thickness is too low, there is the possibility of insufficient fuel supply and unsatisfactory removal of products obtained by electrode reaction. If the average thickness is too high on the other hand, the characteristic improvement obtained by the introduction of the void layer or fiber layer is reduced, and also, there is the possibility of increased production cost. Moreover, there is the possibility that the layer containing the catalyst is dissolved when pores are formed.

When the catalyst layers are stacked as mentioned above, mass transfer can be more promoted than in the case of disposing only one thick catalyst layer.

The catalyst layer 5, 7 satisfy a relation $R_1 \geq R_0 \times 1.2$. In the above inequality, $R_1$ represents a alignment ratio of the catalyst layer and $R_0$ represents a alignment ratio of the catalyst material in powder form in which crystalline planes of the catalyst material orient randomly. Here, the catalyst material in powder form means the catalyst material constituting the catalyst layer 5, 7. (hereinafter also referred to as "powdered catalyst material").

More specifically, the alignment ratio is calculated from a X-ray diffraction spectrum having a diffraction angle $2\theta$ range from 10 to 90 degrees measured using Cu-Kα-rays, and is defined as a ratio of the diffraction peak area contributed by the most closely packed crystalline planes of a material to the total area of its all diffraction peaks at the $2\theta$ range from 10 to 90 degrees.

The Cu-Kα-rays are X-rays having a wavelength of 0.15418 nm and a spectrum obtained by measuring X-ray diffraction using these X-rays is also hereinafter called "XRD spectrum".

The ratio $R_1$ is preferably 1.3 times or more of the ratio $R_0$.

Although the reason of the high durability of the catalyst layer 5, 7 according to the embodiment has not been clarified completely, it is inferred that, because the ratio $R_1$ is sufficiently larger than the ratio $R_0$ as mentioned above, there is a good alignment of different crystalline grains and a high percentage of the closely packed crystalline planes of the catalyst material in the surfaces facing another electrode in the catalyst layer 5, 7 according to the embodiment. The good alignment improves surface homogeneity, which, along with the closely packed crystalline planes in the surface helps to suppress catalyst dissolution.

The following explanations are furnished as to a method of measuring XRD spectrums of the catalyst layer and powdered catalyst material.

Figure 4:
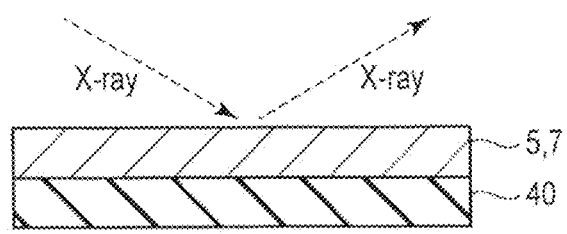
FIG. 4 is a view schematically showing a method of measuring X-ray diffraction used for a catalyst layer according to an embodiment.

FIG. 4 is a view schematically showing a method of measuring X-ray diffraction used for a catalyst layer according to the embodiment.

In the measurement of the XRD spectrum of the catalyst layer, a plate sample obtained by forming the catalyst layer 5, 7 on a substrate 40 is used. X-rays are applied to the sample as shown in FIG. 4 to conduct X-ray diffraction measurement, thereby obtaining XRD spectrums.

On the other hand, the XRD spectrum of the powdered catalyst material can be obtained in the following manner. First, the catalyst material with the same composition is prepared by arc-melting method or sintering method or the like and ground to obtain a powder sample having an average particle diameter of 50 μm or less. Also, the powder sample may be obtained by using carbon black as a support and by sputtering the catalyst on the surface of stirring carbon black. The powder material produced in the above methods has a random distribution of crystalline grain and crystalline planes. Then, X-ray diffraction of the sample is measured to obtain an XRD spectrum. In the case where the ASTM card of the catalyst material is present and the material described in the ASTM card is a powder, the XRD spectrum described in the ASTM card may be used as the XRD spectrum of the powdered catalyst material.

When the catalyst layer is formed from two or more types of catalyst materials, it is only necessary that the ratio $R_1$ of at least one type of catalyst material is 1.2 times or more of the ratio $R_0$.

Figure 5:
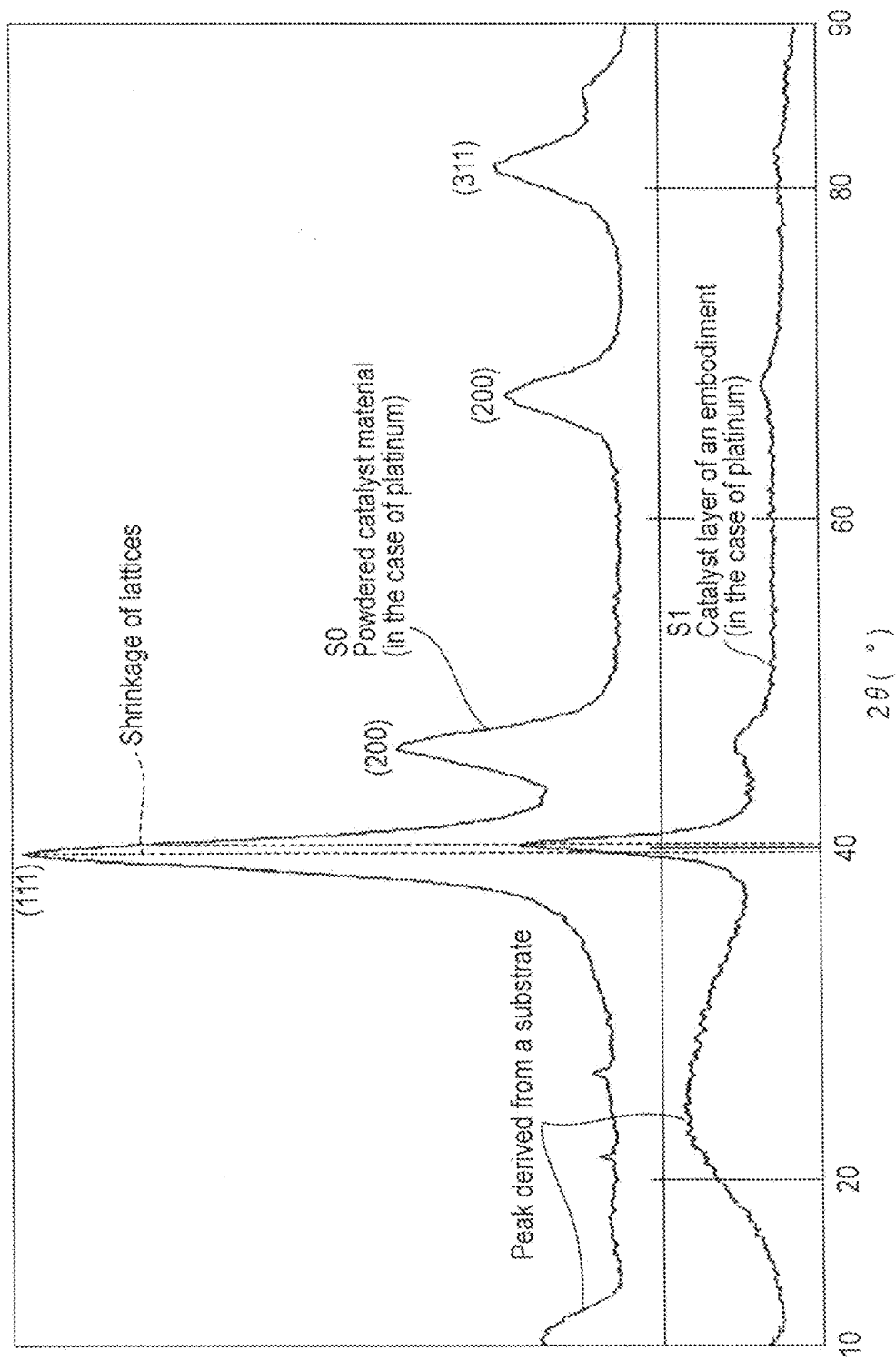
FIG. 5 is a view showing XRD spectrums of a catalyst layer according to an embodiment and a powdered catalyst material.

FIG. 5 is a view showing XRD spectrums of a catalyst layer according to an embodiment and a powdered catalyst material. FIG. 5 is an XRD spectrum when using a catalyst material containing Pt, wherein a main peak derived from Pt is present in a range of a diffraction angle 2θ ranging from 35 to 90 degrees in the XRD spectrum in FIG. 5 showing the range of a diffraction angle 2θ ranging from 10 to 90 degrees.

Pt exhibits a face centered cubic (fcc) structure. For the powdered catalyst material and the catalyst layer according to the embodiment the peak between 36 to 44 degrees in FIG. 5 is regarded as (111) peak, the most closely packed crystalline planes of Pt. When main peaks (111), (200) and (311) are presented in the range from 10 to 90 degrees of a diffraction angle 2θ, the alignment ratio (R) is calculated using the following equation.

$$R = \text{an area of (111)}/[\text{an area of (111)} + \text{an area of (200)} + \text{an area of (311)}]$$

In an example shown in FIG. 5, the ratio $R_1$ obtained for the spectrum S1 is about 1 because few peaks other than (111) are found. On the other hand, the ratio $R_0$ obtained for the spectrum S0 is less than 0.5 because large peaks (200) and (311) are found other than (111) and then $R_0$ is calculated from the integrated intensities of each peak using the above equation. Accordingly the ratio $R_1$ is about two or more times of the ratio $R_0$.

It is preferable that the spacing of the most closely packed planes in the catalyst layer 5, 7 is, for example, in a range from 95 to 98% of the one in its corresponding powdered catalyst material. It is considered that the shorter spacing means a stronger atomic bonding energy, and thus improve the resistance to the catalyst dissolution. When the spacing is in the above range, the durability can be improved with maintaining the activity of the catalyst. Moreover, the oxygen reduction activity of platinum can be improved by slightly reducing the lattice spacing. This reason is considered to be that the adhesion of reactant to and desorption of reaction products from the surface of the catalyst are well balanced.

The catalyst layer 5, 7 is manufactured by forming a layer including a catalyst material and a pore-forming material as a catalyst layer precursor and by removing the pore-forming material from this catalyst layer precursor. More specifically, the catalyst layer 5, 7 is manufactured in the following procedures.

First, a catalyst layer precursor including a mixture of a catalyst material and a pore-forming material is formed on a substrate by sputtering or vapor deposition. Specifically, the catalyst material and pore-forming material are simultaneously formed on the substrate by sputtering or vapor deposition. Or, a target obtained by mixing the catalyst material with the pore-forming material is used to carry out sputtering or vapor deposition.

As the pore-forming material, one having higher solubility in a washing solution used in acid washing or alkali washing which will be explained later than the catalyst material is used. Although the pore-forming material is a metal or metal oxide, a metal is preferable because it generally has a high forming rate and can be removed in a short time and generally has a good operability and a low fabrication cost. As the metal to be used as the pore-forming material, at least one metal selected from the group consisting of Mn, Fe, Co, Ni, Zn, Sn, Al, and Cu is preferable. Particles of ceramics such as oxides or nitrides may also be used. In the following explanations, the pore-forming material is regarded as a pore-forming metal.

The structure and stability of an oxide can be controlled by introducing oxygen into the atmosphere in the sputtering or vapor deposition. At this time, the partial pressure of the oxygen in the atmosphere is preferably designed to be less than 20%. There is the case where not all the pore-forming metal can be removed in the process of removing the pore-forming metal from the catalyst layer precursor which will be explained later. For this, the ratio occupied by the pore-forming metal in the catalyst layer precursor may be designed to be higher than the target porosity.

As the substrate, one having a flatness of 60% or more and preferably 70% or more is used. Here, a reference plane is defined as the plane parallel to the surface of a substrate viewed macroscopically. And the flatness is defined as the ratio of the area of the orthographic projection on the reference plane contributed from a flat region with an angle of 10 degrees or less to the reference plane of the substrate surface to the area of the orthographic projection on the reference plane of the whole substrate surface. The flatness of the substrate on which the catalyst film is formed affects the growth and orientation of metal or alloy crystals. When the flatness is too low, it is difficult to raise the ratio of $R_1$ to $R_0$. For example, a carbon sheet or Teflon (trademark) sheet is used as the substrate.

In succession, the pore-forming metal is dissolved, for example, by washing using an acid or alkali solution, and/or by the electrolytic method to remove the metal from the catalyst layer precursor. A catalyst layer having pores is obtained in this manner.

When an acid solution is used as the washing solution, the catalyst layer precursor can be dipped in, for example, nitric acid, hydrochloric acid, sulfuric acid, or mixture solution of these acids for about 5 min to 50 hr. At this time, the acid solution is heated to a temperature of about 50 to 100° C. Further, bias voltage may be applied to promote the dissolution of the pore-forming metal. Moreover, heat treatment may be performed after these treatments.

In order to suppress the dissolution of the catalyst material during the dissolution of the pore-forming metal, a process of fixing the catalyst layer precursor to the substrate may be performed in advance. For example, the catalyst layer precursor may be impregnated with a polymer solution such as Nafion (manufactured by Du Pont), then dried before conducting the pore-forming metal removal.

A polymer solution such as Nafion (manufactured by Du Pont) may be added to the obtained catalyst layer by spraying or impregnation method to improve the proton conductivity of the catalyst layer and the adhesion to other members.

As mentioned above, a part of the pore-forming metal may be left in the resulting catalyst layer 5, 7. The residual pore-forming metal forms a stable oxide and is considered to contribute, for example, to the restriction on the growth of the catalyst material, maintenance of the structure of the catalyst layer, and promotion of proton conductivity.

Next, materials other than the catalyst layer will be explained with reference to FIG. 1.

The electrolyte membrane 4 contains, for example, an electrolyte having proton conductivity. This electrolyte membrane 4 has the function of conducting protons derived from the fuel supplied to the first electrode 2 to the second electrode 3. As the electrolyte having proton conductivity, fluororesins having a sulfonic acid group (for example, Nafion (manufactured by Du Pont), Flemion (manufactured by Asahi Glass Co., Ltd.), and Aciplex (manufactured by Asahi Kasei Corporation) or inorganic materials such as tungstic acid or phosphorous-tungstic acid may be used. The thickness of the electrolyte membrane 4 may be properly determined in consideration of the characteristics of the obtained MEA 1. The thickness of an electrolyte membrane 4 is preferably 5 to 300 µm and more preferably 10 to 150 µm from the viewpoint of strength, dissolution resistance, and output characteristics of MEA 1.

When MEA 1 is used in a fuel cell, the first electrode 2 and second electrode 3 are an anode and a cathode respectively and hydrogen is supplied to the anode and oxygen/Air is supplied to the cathode. The first electrode 2 and second electrode 3 may optionally contain a first gas diffusion layer 6 and a second gas diffusion layer 8 respectively. Hereinafter, as the term indicating one of the first and a second gas diffusion layer 6 and 8 or both of the first and second gas diffusion layers 6 and 8, the term "gas diffusion layer 6, 8" is also used.

The gas diffusion layer 6, 8 preferably contains a water repellent. The water repellent promotes the water-repellency of the gas diffusion layer 6, 8 to thereby prevent the occurrence of the so-called flooding phenomenon that the water created by power generation is not discharged from the inside of the catalyst layer 5, 7 to thereby causes clogging by water. Examples of the water-repellent include fluorine type polymer materials such as a polytetrafluoroethylene (PTFE), polyvinylidene fluoride (PVDF), polyhexafluoropropylene, and tetrafluoroethylene-hexafluoropropylene copolymer (FEP). The water-repellent agent may be introduced into the gas diffusion layer 6, 8 after the catalyst layer 5, 7 is formed.

According to another embodiment, there is provided a membrane electrode assembly including: a first electrode and a second electrode, at least one of which containing the catalyst layer described above; and an electrolyte membrane inserted between the first electrode and the second electrode.

MEA according to the embodiment is manufactured by the following procedures.

First, the catalyst layer 5, 7 according to the embodiment are transferred to the gas diffusion layer 6, 8 or to the electrolyte membrane 4. These layers and electrolyte membrane are stacked as shown in FIG. 1 and are bonded by heating and pressing to obtain MEA 1.

The above materials are generally bonded by using a hot press machine. A press temperature is lower than a glass transition temperature of the polymer electrolyte to be used as the binder in the electrodes 2 and 3 and electrolyte membrane 4 and is generally 100 to 400° C. A press pressure is generally 5 to 200 kg/cm² though depending on the hardness of the electrodes 2 and 3.

when the catalyst layer 5, 7 is formed on the gas diffusion layer 6, 8 or on the electrolyte membrane 4 directly, there is the possibility that the catalyst layer having a larger ratio $R_1$ as mentioned above cannot be obtained.

In MEA 1 according to the embodiment, the catalyst layer 5, 7 has high resistance to dissolution.

According to another embodiment, there is provided an electrochemical cell including: the membrane electrode assembly described above; and a first separator and a second separator which sandwich the membrane electrode assembly therebetween.

Figure 6:
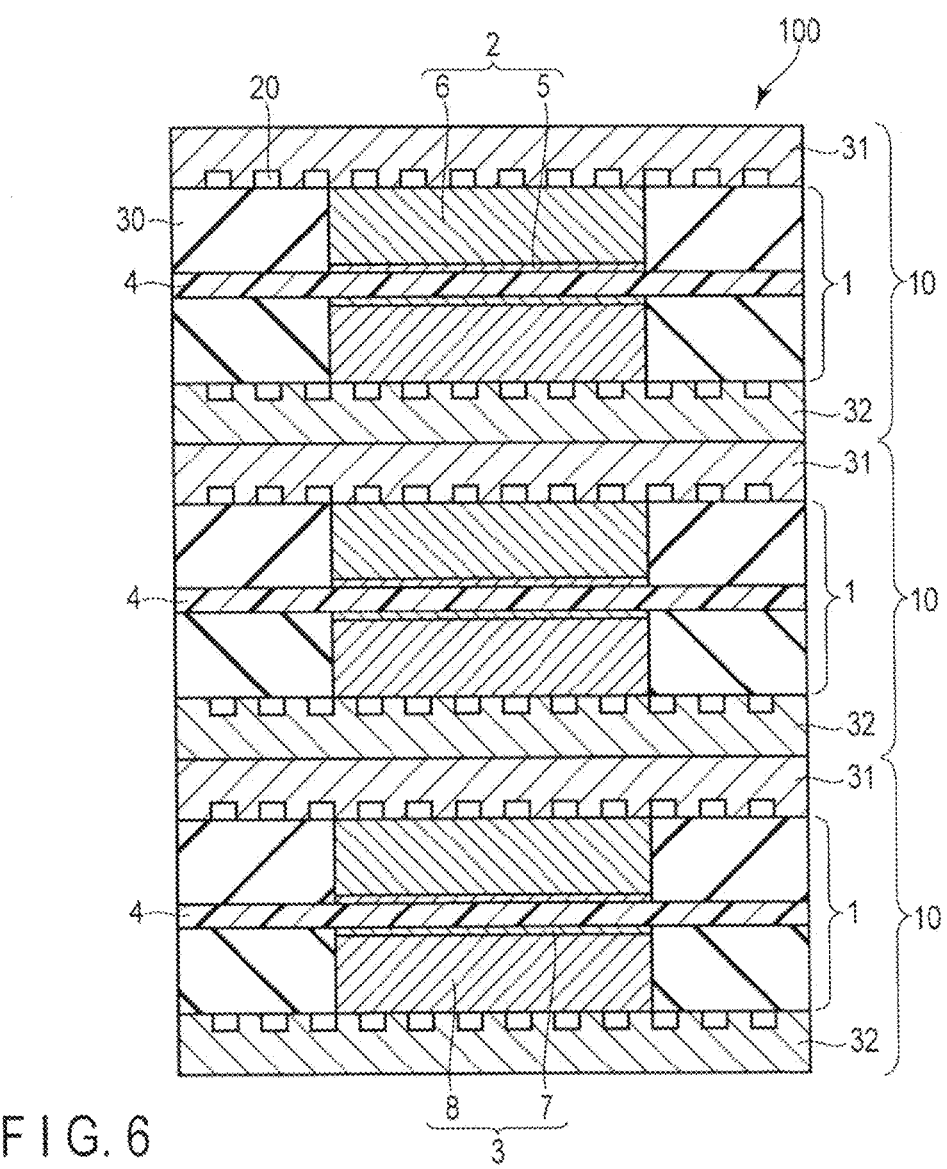
FIG. 6 is a view schematically showing an example of an electrochemical cell according to an embodiment.

FIG. 6 is a view schematically showing an example of an electrochemical cell according to the embodiment. The electrochemical cell shown here is assumed to be a fuel cell to explain.

A fuel cell 100 has a structure in which the membrane electrode assembly 1 shown in FIG. 1 is sandwiched by a first separator (specifically, an anode separator) 31 and a second separator (specifically, a cathode separator) 32. Here, the first electrode 2 is an anode and the second electrode 3 is a cathode.

The anode separator 31 and the cathode separator 32 are each provided with a passage 20 used to supply air or fuel to MEA 1. A seal 30 is disposed on each side of the catalyst layers 5 and 7 and on each side of the gas diffusion layers 6 and 8 to prevent fuel leakage and oxidizer leakage from the membrane electrode assembly 1.

A fuel cell 100 is manufactured by stacking single cells including this MEA 1 and two separators 31 and 32 and by connecting these single cells in series. A higher electromotive force can be obtained by using a plurality of MEAs 1. No particular limitation is imposed on the shape of the fuel cell 100 and an appropriate shape is properly selected corresponding to the desired characteristics of a fuel cell such as voltage. Here, the fuel cell 100 is assumed to have a stack structure as shown in FIG. 6 to explain. However, the fuel cell 100 may have a plane configuration. Further, the number of single cells to be combined is not limited to 3 as shown in FIG. 6.

As the fuel, for example, hydrogen, reformed gas, an aqueous solution containing at least one selected from the group consisting of methanol, ethanol, and formic acid may be used.

Although the above explanations are furnished as to a fuel cell as one example of the electrochemical cell of the embodiment, the above electrochemical cell can be an electrolyte cell in another example. For example, the electrolyte cell contains an oxygen evolution catalyst electrode in place of the anode as the first electrode 2.

According to a further example, the electrochemical cell according to the embodiment is a micro electro mechanical systems (MEMS) type electrochemical cell.

The electrochemical cell according to the embodiment contains MEA including the catalyst layer having high dissolution resistance and catalyst activity and is therefore superior in long-term stability.

EXAMPLE

Examples and comparative examples will be explained below.

<Fabrication of a Catalyst Layer>

Examples 1 to 8

A layer containing a metal or alloy and a pore-forming material as shown in Table 1 was formed on a carbon sheet (G347B, manufactured by Tokai Carbon Co., Ltd.) having a flatness of 70% or more by sputtering to obtain a catalyst layer precursor. In each of example, a sputtering parameter for a metal or alloy, and pore-forming metal were so adjusted that a catalyst loading amount was 0.1 mg/cm² and a porosity is a value shown in Table 1.

In succession, the obtained catalyst layer precursor was subjected two times to acid treatment in which the precursor was dipped at 80° C. in an aqueous 10 wt % sulfuric acid solution for 30 min, and then, the precursor was washed with pure water, followed by drying to obtain a catalyst layer.

Comparative Example 1

A monolayer catalyst layer containing Pt was formed on a whisker substrate (organic pigment: Pigment Red 149, average diameter: about 50 nm) by sputtering. At this time, the catalyst layer was formed such that a loading amount was 0.10 mg/cm$^2$.

Comparative Example 2

A carbon paper Toray 060 (manufactured by Toray Industries, Ltd.) provided with a carbon layer 5 to 50 μm in thickness was used as a substrate. Layers each containing an alloy having a composition represented by $Pt_{0.25}Mn_{0.75}$ and layers containing Mn (pore-forming material) were alternately formed on the substrate to make a stacked structure. Here, 5 alloy layers and 4 pore-forming layers (thickness of pore-forming layer: 50 nm) were formed. At this time, the process was performed such that the total loading amount of the catalyst was 0.10 mg/cm$^2$. In succession, the processes for dissolution of the pore-forming metal and washing and drying of the catalyst layer were performed in the same manner as in Examples 1 to 8 to obtain a catalyst layer having a stacked structure.

Comparative Examples 3 and 4

Using a carbon sheet used in Examples 1 to 8, a layer containing Pt was formed on the carbon sheet by sputtering to obtain a catalyst layer precursor. At this time, amounts of the metal and pore-forming metal, and a sputtering parameters were so adjusted that a catalyst loading amount was 0.1 mg/cm$^2$ and a porosity is a value shown in Table 1. In succession, processes for dissolution of the pore-forming metal and washing and drying of the catalyst layer were performed in the same manner as in Examples 1 to 8 to obtain a catalyst layer.

The catalyst layers obtained in Examples and Comparative Examples were evaluated in the following procedures.

<Fabrication of Electrodes>

Electrodes were fabricated in the following procedures by using the catalyst layers obtained in the Examples and Comparative Examples above.

Each catalyst layer obtained in Examples 1 to 8 and Comparative Examples 1, 3, and 4 was thermal compression-bonded and transferred to a carbon paper Toray 060 (manufactured by Toray Industries, Ltd.) provided with a carbon layer 5 to 50 μm in thickness on the surface thereof at 150° C. under a pressure of 20 kg/cm$^2$ for 5 min to obtain a electrode. Since the catalyst layer of Comparative Example 2 used a carbon paper provided with a carbon layer as the substrate, the substrate and the catalyst layer formed thereon were used as it was as the electrode.

Comparative Example 5

Pt Standard Electrode 2 g of a commercially available particulate Pt catalyst (Model number: TEC10E50E-HT, manufactured by Tanaka Kikinzoku Kogyo K.K.), 5 g of pure water, 5 g of a 20% Nafion (manufactured by Du Pont) solution, and 20 g of 2-ethoxyethanol were sufficiently stirred to disperse, thereby preparing a slurry. The obtained slurry was applied to a carbon paper (manufactured by Toray Industries, Ltd., 350 μm) processed by water-repellent treatment and dried to obtain a Pt standard electrode having a Pt catalyst loading density of 0.1 mg/cm$^2$.

<Fabrication of MEA>

A square specimen of 3.2 cm×3.2 cm having an area of about 10 cm$^2$ which was cut from each electrode fabricated above was used as a cathode. The Pt standard electrode fabricated in Comparative Example 5 was used as an anode.

Nafion 112 (manufactured by Du Pont) was sandwiched between these electrodes, which were bonded with each other at 125° C. under a pressure of 30 kg/cm$^2$ for 10 min by thermal compression bonding to obtain a MEA.

<Fabrication of a Single Cell of a Fuel Cell>

MEA obtained above was sandwiched between a first separator and a second separator which each includes a passage, to obtain a single cell of a polymer electrolyte fuel cell.

The fabricated catalyst layer, MEA, and single cell were evaluated for the following articles.

1. Porosity, Pore Diameter and Pore Diameter Distribution

First, each catalyst layer obtained in Examples 1 to 8 and Comparative Examples 1 to 4 was cut. When the catalyst layer had, for example, a rectangular form, the center of the short side of the rectangle was cut in parallel to the long side. Further, the Pt standard electrode of Comparative Example 5 was also cut in the same manner. The position of the center of the section was observed by SEM. It was confirmed that each catalyst layer obtained in Examples 1 to 8 and Comparative Examples 3 and 4 had a single layer structure including pores. It was also confirmed that the catalyst layer of Comparative Example 1 had a dense single layer structure and the catalyst layer of Comparative Example 2 had a stacked structure in which catalyst layers including pores and void layers were alternately laminated. The electrode of Comparative Example 5 was confirmed to have a single layer structure including pores.

Further, the catalyst layer or the standard electrode were cut at the upper part, center part, and lower part along the direction of the thickness and further, each part was observed at 3 positions by SEM. SEM images observed at a magnification of 200,000 in a total of 9 visual fields were obtained and the catalyst material was distinguished from pores based on the contrast to calculate the area occupied by the pores in each visual field. The volume of the pores was calculated based on this area. The ratio of the volume occupied by the pores in the entire catalyst layer was calculated in each visual field to determine an average of these ratios in 9 visual fields as the porosity of the sample.

Further, in each visual field, the volume of pores having a pore diameter of 5 to 100 nm and the volume of all pores were calculated based on their area results. Then, from these values, the ratio of the pores having a pore diameter of 5 to 100 nm to all pores was calculated. An average of the ratios obtained in 9 visual fields was determined as the pore diameter distribution ratio (vol %).

In this case, with regard to Comparative Example 2 having a stacked structure, the void layer present between the catalysts layers was excluded from the aforementioned pores.

2. $R_1/R_0$ and Crystalline Planes Spacing

XRD spectrums of the catalyst layers obtained in Examples 1 to 8 and Comparative Examples 1 to 4 were measured by an X-ray diffraction analyzer using Cu-Kα rays (wavelength: 0.15418 nm). The measurement was made in a diffraction angle 2θ range from 10 to 90 degrees. An XRD spectrum of the Pt standard electrode obtained in Comparative Example 5 was also measured in the same manner. Because this Pt standard electrode is constituted of platinum nano-particle powders and therefore, the distribution of crystalline planes is random. For this, with regard to the Pt standard electrode, the XRD spectrum of a powder sample obtained by grinding the Pt standard electrode was measured. In this case, the obtained spectrum was similar to the XRD spectrum of the ASTM card of Pt.

With regard to each XRD spectrum, the peaks derived from the catalyst material in catalyst layers were identified to find the alignment ratio $R_1$ using the approach explained before.

On the other hand, powder samples with the same composition as the catalyst material obtained in Examples 1 to 8 and Comparative Examples 1 to 4 were prepared. XRD spectra of these powder samples were likewise measured and the peaks derived from the catalyst material were identified to find the alignment ratio $R_0$ using the approach explained before.

Then, the ratio of $R_1$ to $R_0$ (that is, ratio $R_1/R_0$) was found in each of Examples and Comparative Examples. According to the need, a simple method was used in which a peak area calculated from peak strength and half-value width was used in place of the above integrated intensity.

Further, as to the above catalyst material, the spacing of its most closely packed crystalline planes was also obtained form its XRD spectrum and thus the ratio of its spacing to that obtained from its ASTM card was calculated.

As to Examples 6 to 8, catalyst powders with the same composition as those used in Examples 6 to 8 were prepared by arc-melting method and then, ground into powder having an average particle diameter of 50 μm or less to produce a powder sample having a random crystalline plane distribution. This powder sample was measured by X-ray diffraction to obtain an XRD spectrum, which was used as the XRD spectrum of each of Examples 6 to 8.

3. Single Cell Voltage

In the obtained single cell, hydrogen was supplied as the fuel to the anode at a flow rate of 20 ml/min and air was supplied to the cathode at a flow rate of 50 ml/min and the single cell was made to discharge at a current density of 1 A/cm² to measure cell voltage (V) after 50 hr. At this time, the single cell was kept at 50° C.

4. Dissolution Resistance

Figure 7:
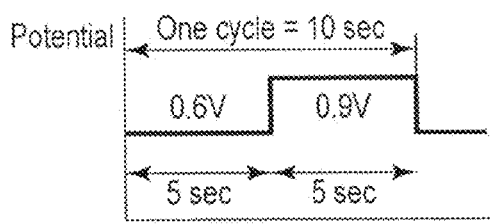
FIG. 7 is a view showing the outline of a dissolution resistance test.

The catalyst dissolution resistance was evaluated according to the load response durability protocol shown in FIG. 7. The single cell was kept at 70° C. while supplying hydrogen to the anode at a flow rate of 40 ml/min and nitrogen to the cathode at a flow rate of 40 ml/min. In this condition, a cycle involving (1) a step of maintaining a voltage of 0.6 V for 5 sec and in succession, (2) a step of maintaining a voltage of 0.9 V for 5 sec was repeated 30,000 times. Thereafter, cell voltage was measured and compared with that measured after 50 hr to calculate the deterioration rate. A sample having a deterioration rate less than 10% was rated as "dissolution resistance A", a sample having a deterioration rate of 10 to 25% was rated as "dissolution resistance B", and a sample having a deterioration rate exceeding 25% was rated as "dissolution resistance C".

The results obtained for the above evaluation are shown in Table 1.

TABLE 1

|  | Catalyst material | Pore-forming material | Porosity | Pore diameter distribution (%)* | $R_1/R_0$ |
|---|---|---|---|---|---|
| Example 1 | Pt | Al | 20 | 50.0 | 1.6 |
| Example 2 | Pt | Al | 35 | 60.0 | 1.4 |
| Example 3 | Pt | Al | 65 | 70.0 | 1.3 |
| Example 4 | Pt | Fe | 75 | 80.0 | 1.2 |
| Example 5 | Pt | Fe | 90 | 80.0 | 1.2 |
| Example 6 | Pt0.8 Ni0.1 Ta0.1 | Mn | 75 | 70.0 | 1.3 |
| Example 7 | Pt0.7 Co0.3 | Mn | 40 | 55.0 | 1.6 |
| Example 8 | Pt0.8 W0.1 Mo0.1 | Fe | 65 | 60.0 | 1.4 |
| Comparative Example 1 | Pt (wisker substrate) | — | — | No pore | 1.1 |
| Comparative Example 2 | Pt0.25 Mn0.75 (stacked) | Mn | 40 | 50.0 | 1.1 |
| Comparative Example 3 | Pt | Al | 5 | 40.0 | 1.6 |
| Comparative Example 4 | Pt | Al | 95 | 70.0 | 1.0 |
| Comparative Example 5 | Pt particles | — | 70 | 30.0 | 1.0 |

|  | Lattice plane interval (%) | Cell voltage | Dissolution resistance |
|---|---|---|---|
| Example 1 | 98.0 | 0.65 | A |
| Example 2 | 97.0 | 0.67 | A |
| Example 3 | 96.5 | 0.65 | B |
| Example 4 | 96.5 | 0.66 | B |
| Example 5 | 96.5 | 0.65 | B |
| Example 6 | 96.5 | 0.68 | A |
| Example 7 | 97.0 | 0.66 | B |
| Example 8 | 96.5 | 0.67 | B |
| Comparative Example 1 | 100.0 | 0.62 | C |
| Comparative Example 2 | 96.5 | 0.64 | C |
| Comparative Example 3 | 99.5 | 0.63 | C |
| Comparative Example 4 | 96.5 | 0.65 | C |
| Comparative Example 5 | 100.0 | 0.63 | C |

*a ratio of pores having a pore diameter ranging from 5 to 100 nm

The catalyst layers of Examples 1 to 8 each had a ratio $R_1/R_0$ of 1.2 or more. Further, the spacing of the most closely packed crystalline planes in the catalyst layer was in the range from 96.5 to 98.0% of that of the corresponding powder sample. The cell voltage of the single cell containing each of these catalyst layers was high and had better dissolution resistance. Further, in each of the catalyst layers of Examples 1 to 8, a ratio of pores having a pore diameter ranging from 5 to 100 nm to all pores was 50% by vol or more.

As is clear from Table 1, Examples 1 to 8 each had a higher cell voltage and dissolution resistance than each of Comparative Examples 1 to 5 when used for single cells of a fuel cell.

According to the above embodiments or examples, a catalyst layer which has sufficient dissolution resistance and high catalyst activity, and a membrane electrode assembly and an electrochemical cell provided with the catalyst layer can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A catalyst layer comprising a catalyst material, wherein the catalyst layer has a single layer structure and has a porosity of 20 to 90% by vol and the catalyst layer satisfies a relation:

$$R1 \geq R0 \times 1.2,$$

wherein:
R1 is an alignment ratio of the catalyst layer; and
R0 is an alignment ratio of the catalyst material in powder form having a random crystalline plane distribution,
wherein each of the alignment ratios is calculated from a X-ray diffraction spectrum having a diffraction angle 2θ range from 10 to 90 degree measured using Cu-Kα-rays, and is defined as a ratio of a diffraction peak area contributed by the most closely packed crystalline planes of a material to a total area of all diffraction peaks of the same material at the 2θ range from 10 to 90 degree,
wherein the catalyst layer is formed on a substrate having a flatness of 60% or more and wherein the substrate is a carbon sheet.

2. The catalyst layer of claim 1, wherein a ratio of pores having a pore diameter ranging from 5 to 100 nm to all pores is 50% by vol or more.

3. The catalyst layer of claim 1, wherein a spacing of the most closely packed crystalline planes is in a range from 95 to 98% of a corresponding spacing of the catalyst material in powder form with random crystalline plane distribution.

4. The catalyst layer of claim 1, wherein the catalyst layer comprises 30 at % or more of platinum or iridium.

5. A membrane electrode assembly, comprising:
a first electrode and a second electrode, at least one of which containing the catalyst layer of claim 1; and
an electrolyte membrane inserted between the first electrode and the second electrode.

6. An electrochemical cell, comprising:
the membrane electrode assembly of claim 5; and
a first separator and a second separator which sandwich the membrane electrode assembly therebetween.

7. The catalyst layer of claim 1, wherein the substrate has a flatness of 70% or more.

8. The catalyst layer of claim 1, wherein the catalyst layer comprises an alloy having a composition of formula (I):

$$Pt_yRu_zT_{1-y-z} \qquad (I),$$

wherein:
$0.2 \leq y \leq 0.8$;
$0 \leq z \leq 0.8$; and
T is at least one element selected from the group consisting of W, Hf, Si, Mo, Ta, Ti, Zr, Ni, Co, Nb, V, Sn, Al, and Cr.

9. The catalyst layer of claim 1, wherein the catalyst layer comprises an alloy having a composition of formula (II):

$$Pt_uM_{1-u} \qquad (II),$$

wherein:
$0 < u \leq 0.9$; and
M is at least one element selected from the group consisting of Co, Ni, Fe, Mn, Ta, W, Hf, Si, Mo, Ti, Zr, Nb, V, Cr, Al, and Sn.

10. The catalyst layer of claim 1, wherein a thickness of the catalyst layer is from 20 nm to 10 μm.

11. The catalyst layer of claim 1, wherein the catalyst material comprises Pt, and each of the alignment ratios is calculated with the following equation:

R=an area of (111)/[an area of (111)+an area of (200)+an area of(311)]

wherein the peaks (111), (200), and (311) are presented in the range from 10 to 90 degrees of the diffraction angle 2θ.

12. The catalyst layer of claim 1, where the catalyst layer is obtained by sputtering the catalyst material on the substrate having a flatness of 60% or more.

* * * * *